Patented Oct. 17, 1939

2,176,113

UNITED STATES PATENT OFFICE 2,176,113

PROCESS FOR PREPARING $\Delta^{5,6}$-3-CHLOR-ETIO-CHOLENONE-17

John Weijlard, Rahway, N. J., assignor to Merck & Co. Inc., Rahway, N. J., a corporation of New Jersey No Drawing. Application March 24, 1936, Serial No. 70,674

3 Claims. (Cl. 260—397)

This invention relates to a process for producing the chlor-ketone, $\Delta^{5,6}$-3-chlor-etio-cholenone-(17), suitable for valuable use in the derivation of certain male sex hormones. More particularly, the invention is concerned with the preparation of this important intermediate in direct steps from cholesterol.

Several methods of preparing this compound have been reported by Butenandt and his co-workers. They first reported [Zeit. Physiol. Chem. 229, p. 192 (1934)] that they had isolated the intermediate ketone from substances obtained from urine concentrates, which had been treated with hydrochloric acid, during purification. Later, Butenandt and his co-workers [Zeit. Physiol. Chem. 237, p. 70 (1935)] reported that they had produced the chlor-ketone through the treatment of synthetic dehydroandrosterone with hydrochloric acid in methyl alcohol solution. The reported yield of chlor-ketone thus obtained was practically negligible.

My own experiments together with the information which can be found in the literature indicate that the preparation using hydrogen chloride is impractical for commercial purposes.

Since $\Delta^{5,6}$-3-chlor-etio-cholenon-(17) is an important intermediate for the production of certain male sex hormones, it is sought to discover a simple process whereby the pure material may be obtained by a smooth reaction and in substantial yield.

I have now found a process of producing the desired chlor-ketone from dibrom cholesteryl chloride which in turn is obtained directly from cholesterol. Generally speaking, my invention involves substantially the oxidation of dibrom cholesteryl chloride, with subsequent debromination.

In order to illustrate more particularly and completely the manner in which my invention may preferably be practiced, a specific example is given below. It is to be understood, however, that the process thus specifically described is susceptible of some modification within the limits of the invention as set forth in the appended claims, and that I do not wish to be restricted to the precise step or order to steps described.

Example

To a mixture of 30 gms. of dibrom cholesteryl chloride in 900 cc. of glacial acetic acid is added a solution of 50 gms. of chromium trioxide in 50 cc. of water and 200 cc. of glacial acetic acid, over a period of about 4 hours, under constant rapid stirring at about 65° C. Thereafter the temperature is gradually raised to about 90° C. until the dibrom cholesteryl chloride is completely dissolved. The temperature is then again lowered to about 60–65° C. and the reaction mixtures stirred for about four hours more at that temperature. The mixture is then diluted with 3 volumes of water, extracted with ether, and the ether solution extracted with dilute HCl and with water to remove chromic compounds.

About 30 gms. of zinc dust and 200 cc. glacial acetic acid are added to the washed ether solution, the ether is distilled off, and the residue heated for about two hours to complete debromination. About ½ liter of ether is added, and the ether solution, freed from insoluble products, is treated with excess NaOH solution in the presence of ice, to remove acidic compounds. The ether is evaporated, and the residue steam-distilled until all volatile ketones are removed. The neutral, steam-distilled gum residue is dissolved in 100 cc. ethanol, a concentrated aqueous solution of 2 gms. of semi-carbazide hydrochloride and 3 gms. of sodium acetate are added, and the mixture refluxed for about two hours. The alcohol is distilled off and the residue treated with hot water to remove water-soluble salts. The dried product is treated with ether, filtered, and washed with liberal amounts of ether to remove gummy material. About 1.0 gm. of white semicarbazone is obtained, having a melting point of 265–270° C.

The chlor-ketone is then prepared in pure form from the semicarbazone by known methods.

The dibrom cholesteryl chloride employed as starting material in the present process may be prepared by the known method of adding bromine to beta-cholesteryl chloride.

I claim as my invention:

1. The process of producing the chlor-ketone $\Delta^{5,6}$-3-chlor-etio-cholenone-(17) which comprises the solution of dibrom cholesteryl chloride in glacial acetic acid over a period of about four hours at a temperature of about 65° C., stirring the mixture rapidly, raising the temperature to about 90° C. until the dibrom cholesteryl chloride is completely dissolved, lowering the temperature to about 60–65° C., stirring the reaction mixture for about four hours at that temperature, diluting it with water, extracting with ether, washing the ether solution with dilute hydrochloric acid and water to remove chromic compounds, adding zinc dust in glacial acetic acid to the washed solution, distilling off the ether, heating the residue for about two hours to complete debromination, adding ether, treating the ether solution with excess NaOH solution in the presence of ice, evaporating the ether, steam-distilling the gummy residue in ethanol, adding a concentrated aqueous solution of semicarbazide hydrochloride and sodium acetate, refluxing the mixture for about two hours, distilling off the alcohol, treating the dried product with ether, filtering and washing with ether to obtain the semicarbazone, dissolving the latter in a mixture of concentrated HCl and ethanol, heating for about 20 minutes, diluting with water, extracting with ether, washing the ether solution with NaOH solution and water, drying with $NaSO_4$, evaporating to complete dryness, and recrystallizing the thus obtained crude chlor-ketone from methanol.

2. In a process for the production of the chlor-ketone $\Delta^{5,6}$-3-chlor-etio-cholenone-(17) the steps which comprise reacting dibrom cholesteryl chloride with chromium trioxide at a temperature of 65° C. for about 4 hours, raising the temperature to about 90° C. until all of the dibrom cholesteryl chloride is completely dissolved, and then lowering the temperature to about 60–65° C. for about 4 hours, debrominating with zinc, and treating with semicarbazide hydrochloride to obtain the corresponding semicarbazone.

3. An improved process for the production of chlor-ketone $\Delta^{5,6}$-3-chlor-etio - cholenone - (17) which comprises reacting dibrom cholesteryl chloride with chromium trioxide in glacial acetic acid at a temperature of about 65° C. for about 4 hours, raising the temperature to about 90° C. until the dibrom cholesteryl chloride is completely dissolved, lowering the temperature to about 60–65° C. for about 4 hours, and subsequently debrominating the oxidation product with zinc in glacial acetic acid.

JOHN WEIJLARD.